United States Patent [19]

White, Jr.

[11] 4,226,716
[45] Oct. 7, 1980

[54] ROTARY FILTER

[75] Inventor: Russell P. White, Jr., Dallas, Tex.

[73] Assignee: Wesley G. McCain, New York, N.Y.

[21] Appl. No.: 971,721

[22] Filed: Dec. 21, 1978

[51] Int. Cl.² ............... B01D 33/10; B01D 37/02
[52] U.S. Cl. ...................... 210/193; 210/402; 210/408
[58] Field of Search ............ 210/67, 77, 79, 75, 210/107, 158, 161, 201, 359, 394, 396, 397, 402, 407, 408, 193; 162/274; 15/256.5

[56] References Cited

U.S. PATENT DOCUMENTS

| | | | |
|---|---|---|---|
| 2,102,780 | 12/1937 | Bielfeldt | 210/201 |
| 2,576,288 | 11/1951 | Fink et al. | 210/201 |
| 3,616,908 | 11/1971 | Rokitansky et al. | 210/67 |
| 3,997,441 | 12/1976 | Pamplin | 210/75 |
| 4,046,690 | 9/1977 | Rodgers et al. | 210/75 |

FOREIGN PATENT DOCUMENTS

| | | | |
|---|---|---|---|
| 879540 | 4/1953 | Fed. Rep. of Germany | 210/396 |
| 903919 | 4/1963 | France | 210/396 |

*Primary Examiner*—Frank Sever
*Attorney, Agent, or Firm*—Richards, Harris & Medlock

[57] ABSTRACT

A rotary filter (10) is disclosed which has a rotating drum (24) disposed within a pressure housing (12). The drum (24) is perforated to form a mesh surface over which a support layer (27) is affixed. Filter material is deposited on the support layer (27) to form a filter layer (30). The particulate matter within a fluid stream is removed by the filter layer (30) to form a filter cake (43) on the surface of the filter layer (30). A blade (42) scrapes the filter cake (43) from the surface of filter layer (30) and deposits the scraped filter cake (43) within a chamber (38). The rotary filter (10) thus operates continuously to filter the process fluid to prevent increasing the fluid pressure across the filter layer (30) due to blocking of the filter.

7 Claims, 4 Drawing Figures

ROTARY FILTER

TECHNICAL FIELD

This invention relates to fluid filters and more particularly to a rotary filter which continuously filters the fluid and separates the filtered particles from the filter material.

BACKGROUND ART

There are many applications which require the removal of foreign particulate matter from a process fluid. Among these applications are chemical production processes, water purification and mineral extraction.

The most common process for removing particulate matter from a fluid is that of filtration. In its simplest form the filtration process comprises passing the fluid carrying the particulate matter through a filter material comprising a porous medium. The openings in the filter material allow the fluid to pass therethrough while the particulate matter greater in size than the pores of the filter are stopped. The retention of the particulate matter in the filter removes them from the fluid which has passed therethrough. Many types of filter materials have been used including metal screens, fibrous materials, porous glass and ceramic, paper, sand, glass beads, and certain plastic and chemical powders.

In each filtration process the number of particles entrapped in the filter gradually increases as more fluid passes therethrough and this causes a reduction in the number of open pores available for the passage of fluid. Thus, as the filter becomes clogged there is a reduction in the flow rate of the fluid through the filter. The fluid flow rate is also dependent upon the pressure differential across the filter, the pressure serving to force the fluid through the filter. However, as more particulate matter is collected in the filter, greater pressure is required to maintain a constant flow rate.

When the filters become excessively clogged by particulate matter the rate of fluid flow will be reduced to a low level. The particulate matter must therefore be removed in order to restore the former flow rate. This has conventionally been accomplished by either back flushing the filter to remove the entrapped particles or by replacing the filter with clean filter material. The frequency at which filters must be either back flushed or replaced is dependent upon the flow rate of fluid through the filter and the density of particulate matter within the fluid.

In one type of filter a drum or series of cylindrical discs are covered with a cloth filter and rotated so that the lower portion of the drum or disc is immersed in the fluid to be filtered. The interior of the drum or disc is equipped with a plurality of compartments which are evacuated when the compartment is immersed in the fluid thereby causing the fluid to be drawn through the cloth filter. The particulate matter thus removed is held on the cloth filter. The drum or disc is then rotated out of the fluid and the particulate matter is scraped from the cloth filter. This however is a slow and cumbersome process which can handle at best only low flow rates.

There exists a need for a filter which can remove particles in the sub-micron size range, permit the free flow of fluid through the filter and trap the foreign particles in such a manner that permits continuous removal of the particulate matter from the filter so as to achieve continuous, full flow rate for the fluid.

DISCLOSURE OF THE INVENTION

In accordance with the present invention a rotary filter includes a drum having a mesh surface coated with a filter material such as diatomaceous earth. The drum is enclosed within a pressure housing for rotation on a tubular shaft. The fluid is pumped to produce a pressure differential across the filter material and to force the fluid carrying the particulate matter through the filter material. As the fluid is forced through the filter material the particulate matter is substantially removed from the fluid and collects on the filter material to form a filter cake. The fluid is then removed from the interior of the drum through the tubular shaft. A knife blade is mounted in a fixed position to cut away the filter cake for storage or removal from the pressure housing. The continuous removal of the filter cake thus permits a constant flow of fluid while the filter process operates continuously.

BRIEF DESCRIPTION OF DRAWINGS

A more complete understanding of the invention and its advantages will be apparent from the following Detailed Description taken in conjunction with the accompanying Drawings in which.

DETAILED DESCRIPTION

Figure 1:
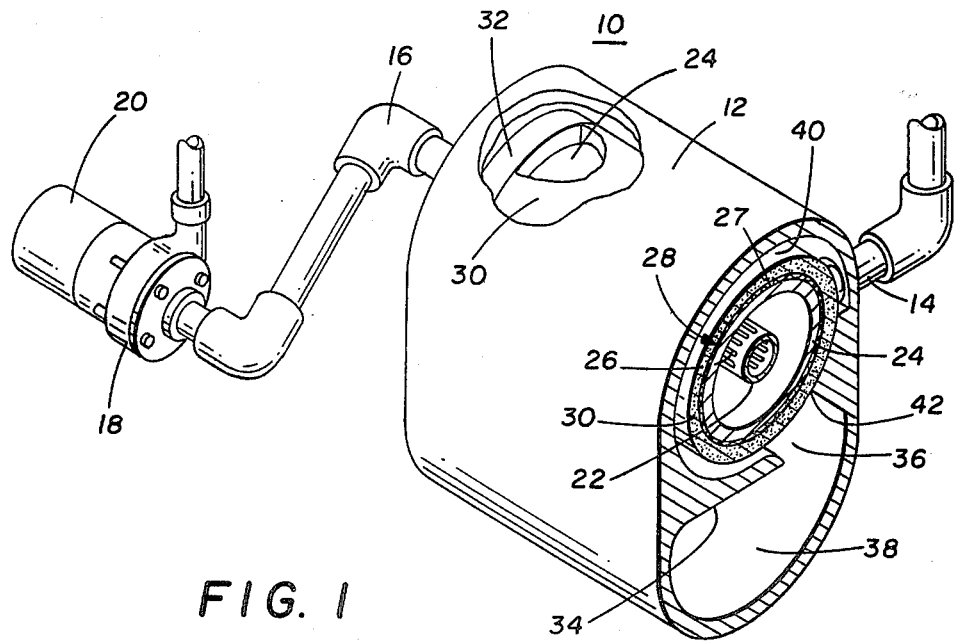
FIG. 1 is a perspective view, partially cut away, showing the rotary filter of the present invention.

Referring to FIG. 1 a rotary filter 10 has a housing 12 with an intake conduit 14 and an exhaust conduit 16. The intake conduit 14 is connected to a fluid source (not shown) and the exhaust conduit 16 is connected to a pump 18 which is driven by a motor 20.

Figure 2:
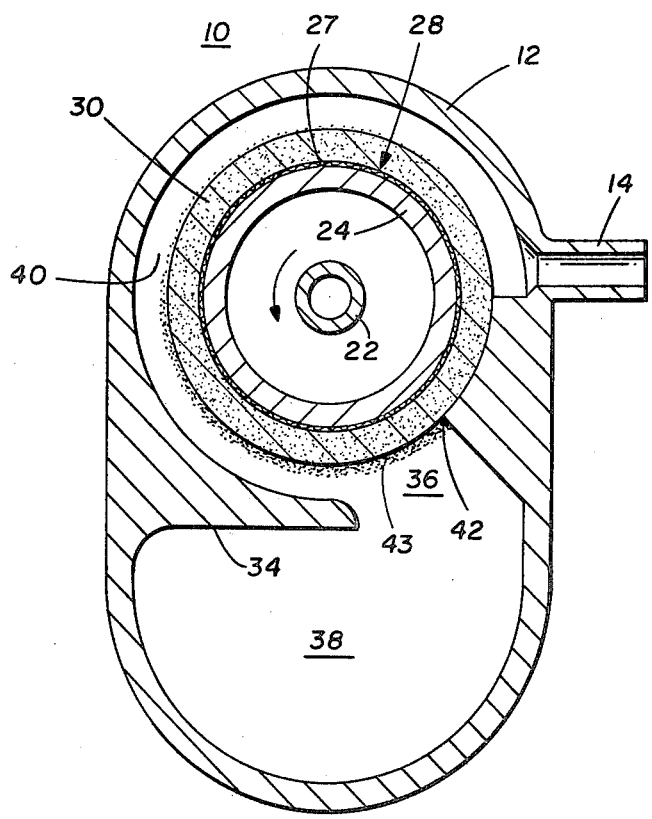
FIG. 2 is a cross sectional view of the filter illustrated in FIG. 1.

Referring now to FIGS. 1 and 2 the housing 12 has a tubular central shaft 22 which rotatably supports a drum 24. The shaft 22 has a series of openings 26 which provide a fluid flow path from the interior of the drum 24 into the shaft 22. The exhaust conduit 16 is connected through the housing 12 to the shaft 22 so that the fluid within the drum 24 is drawn outward by the action of the pump 18.

The surface of the drum 24 is uniformly perforated with small holes to allow passage of the fluid. A filter cloth 27 is wrapped about the exterior surface of the drum 24 covering the holes passing through the surface of the drum. The surface of drum 24 together with the filter cloth 27 form a substrate 28 which acts as a base to support a filter layer 30 which encircles the drum 24. End plates 32 are located on either end of the drum 24 to provide a containment bed for the filter layer 30.

A projecting ledge 34 is joined to the interior of the housing 10 beneath the drum 24, the ledge extending the length of the housing. The ledge 34 extends from one interior surface of the housing 10 toward the opposite surface to form a gap 36 between the ledge and the housing. A storage chamber 38 is formed in the lower section of the housing 10 by the ledge 34. A plenum 40 is formed in the upper section of the housing 10 in the space exterior to the drum 24 and within the housing 10 and ledge 34.

Located immediately above the gap 36 is a blade 42 which extends for the length of the drum 24. The blade 42 is positioned to strip away all of the particulate matter which forms a filter cake 43 above a certain level from the surface of drum 24. After the filter cake 43 is stripped by blade 42 it is caused by gravity and momentum to drop through the slot 36 into the chamber 38. The stripped filter cake 43 is then periodically removed from the chamber 38 as required.

Referring to FIGS. 1 and 2 to describe the operation of the rotary filter of the present invention, a fluid containing particulate matter is input through conduit 14. The purpose of the rotary filter 10 is to remove the particulate matter from the fluid. In a first step the fluid is input to the plenum 40 together with diatomaceous earth which has been entrained into the fluid. The pressure differential created across the substrate 28 by the pump 18 causes te diatomaceous earth to be held to the substrate 28. The diatomaceous earth is supplied through the input port 14 together with the fluid until a complete filter layer 30 is formed on the substrate 28 between the end plates 32. The filter layer 30 continues to increase in thickness until the filter material is stripped by the blade 42 due to rotation of drum 24.Thus, the blade 42 determines the thickness of the filter layer 30.

Diatomaceous earth used as a filter in the manner described effectively filters particles down to the micron and sub-micron size range.

After the diatomaceous earth has been deposited on the substrate 28 the process fluid is input through conduit 14 to be filtered for remoyal of particulate matter. The pressure differential across the filter layer 30 and substrate 28 causes the fluid to flow through the drum and slots 26 into the shaft 22. The fluid is then drawn out through exhaust conduit 16 to pump 18. As the fluid flows through the diatomaceous earth the particulate matter is filtered from the fluid and embedded on the surface of the filter layer. This process continues and results in the formation of the filter cake 43 comprising the particulate matter. Filter cake 43 increases in thickness until it reaches the edge of blade 42. When the filter cake 43 reaches blade 42 it is scraped from the surface of filter 30 and the scraped filter cake is deposited within chamber 38. As the drum 24 rotates past blade 42 a fresh filter surface is exposed to the process fluid. With a continuous flow of fluid and rotation of drum 24, more and more particulate matter is deposited as a filter cake and at the same time the filter cake is stripped and the surplus material deposited in chamber 38.

By continuously stripping the filter cake 43 from the surface of the filter material 30, the pressure differential across the drum 24, cloth 27 and filter material 30 is held constant and it is possible to maintain a constant rate of fluid flow through the filter 10. Thus, the foreign particulate matter is removed from the fluid and stripped from the filter material at the same rate.

Figure 3:
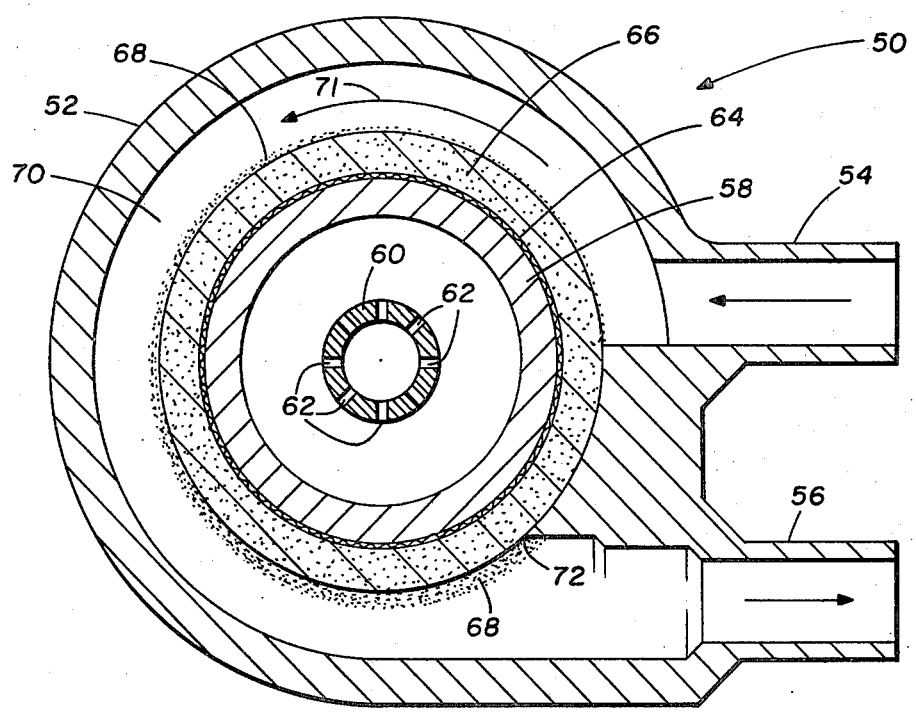
FIG. 3 is a cross sectional view of an alternative filter structure in accordance with the present invention.

An alternative embodiment of the present invention is illustrated in FIG. 3. The rotary filter 50 illustrated in this FIGURE has a housing 52 having an input conduit 54 and an exhaust conduit 56. A drum 58 is mounted within housing 52 for rotation about a tubular shaft 60 having a plurality of slots 62 therethrough.

A layer of clothlike material forms a base 64 which is wrapped about the drum 58. Covering the base 64 is a filter layer 66 comprising a material such as diatomaceous earth as discussed above. On top of the filter layer 66 is a thin layer of filter cake 68 which comprises the particulate matter that has been removed from the fluid passing through the rotary filter 50. A plenum area 70 is formed between the filter layer 66 and housing 52. Shaft 60 is connected to an output conduit (not shown).

Operation of the embodiment shown in FIG. 3 comprises pumping a fluid carrying particulate matter to be removed into the input conduit 54 while rotating the drum 58 in the direction of arrow 71. Initially a filter material, diatomaceous earth, is entrained within the fluid entering conduit 54 until the filter material is caused to cover the base 64 with uniform coating to produce filter layer 66. The material is caused to adhere to the base due to a pressure differential across the drum caused by the input pressure of the fluid and the lesser pressure at the output port connected to shaft 60.

After a layer of filter material 66 has been deposited on the drum 58, the filtration operation is begun by pumping the process fluid through conduit 54 into the plenum 70. Due to the pressure differential between the plenum and the exhaust within shaft 60 the fluid is driven through the filter layer 66 to the interior of the drum 58 and through the holes 62 into the shaft 60. During this process the particulate matter within the fluid is filtered out by the filter layer 66. As the drum 58 rotates the filtered material continues to coat the outer surface of the filter layer 66 forming an increasing thickness layer. This is the layer of filter cake 68. The filter cake will continue to grow in thickness until the cake reaches a blade 72 which extends the length of drum 58. Blade 72 is attached to the interior of housing 52. Blade 72 scrapes off the layer of filter cake 68 and deposits the filtered material in the vicinity of the exhaust conduit 56. The transfer of the filtered material to the exhaust conduit is aided by the momentum of the material and gravity. The flow from exhaust conduit 56 is regulated so that the pressure of the fluid in plenum 70 causes the scraped filter cake to be removed through the exhaust conduit 56. The filtered fluid passes through the drum 58 and into shaft 60 for output from the rotary filter 50 for distribution or further processing.

The drum 58 is rotated at varying rates depending upon such factors as the degree of contamination of the fluid with the particulate matter, the fluid flow rate desired, the degree of filtration required, and the type of particulate matter being filtered. A typical speed is in the range of 10-100 revolutions per minute.

Figure 4:
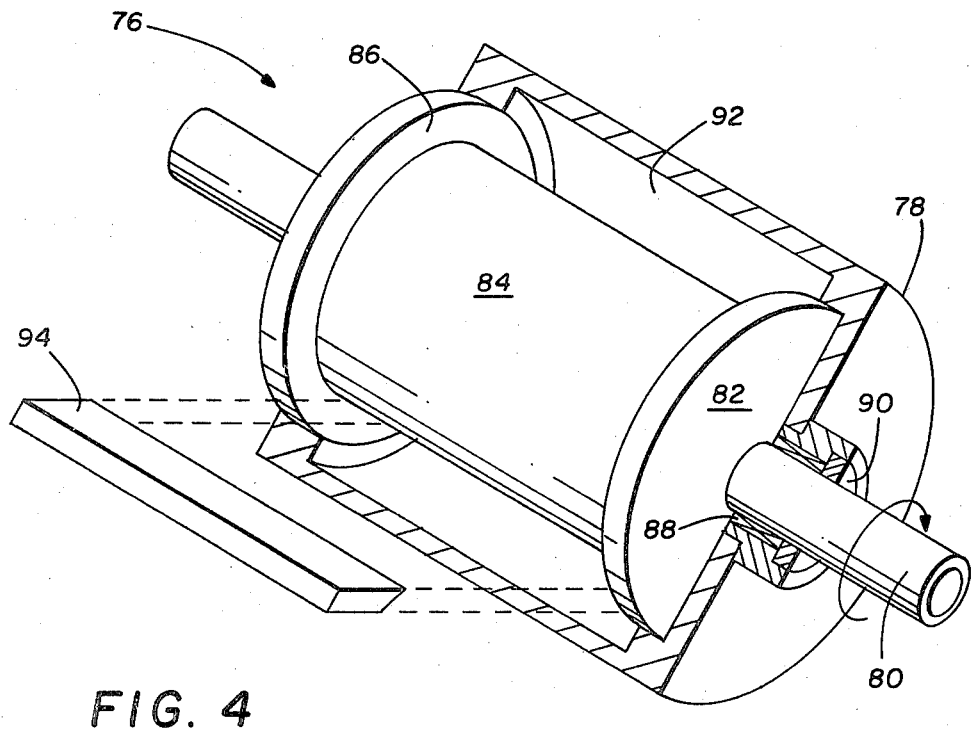
FIG. 4 is a cut away perspective view of a still further embodiment of a rotary filter in accordance with the present invention.

A still further embodiment of the present invention is illustrated in FIG. 4. A rotary filter 76 has a cylindrical housing 78. A tubular shaft 80 passes through the ends of the housing 78 and has rigidly affixed thereto end plates 82 and 86 and a drum 84.

Shaft 80 is supported by bearings 88 and is within a shaft seal 90 which prevents fluid flow from within the housing 78 along the shaft 80. Similar bearings and a seal support the shaft 80 at the opposite end of housing 78.

Shaft 80 is provided with a plurality of openings through the section within drum 84 to receive fluid which has passed into the interior of drum 84. A plenum 92 is formed between the interior of the housing 78 and the exterior of the drum 84.

In operation the shaft 80 is rotated by a power source (not shown) which in turn causes the drum 84 to rotate similarly. A fluid is input to plenum 92 together with a filter material, for example diatomaceous earth, and the pressure within the plenum 92 is maintained so that the fluid is driven through the drum 84, which is perforated with numerous holes. The fluid is then exhausted from the filter 76 through the tubular shaft 80. The drum 84 as described for the previous embodiments is covered with filter support cloth to support the diatomaceous earth and form a filter layer as described above. The filter support cloth and filter layer are not shown in this embodiment.

A fluid containing the particulate matter is injected into plenum 92 where it is forced through the filter layer, cloth and drum 84 into the interior of the drum and out through the exhaust conduit comprising shaft 80. As more fluid is passed through the filter layer a filter cake will be formed on the surface of the filter layer. A blade 94 is positioned within the housing 78 so that the blade surface extends between the end plates 82 and 86. The position at the blade determines the thickness of the filter layer. As the filter cake accumulates on the filter layer it will be stripped from the surface of the layer. The stripped filter cake settles to the bottom of the plenum 92 where it is periodically removed.

The present invention provides a rotary filter wherein a pressure differential is maintained across a rotating drum having a filter layer which causes a buildup of filter cake thereon. A cutting blade is provided in a fixed location for stripping off the filter cake and maintaining a constant filter layer thickness. The stripped filter cake is removed from the flow stream and deposited in a chamber or exited through a flow line to separate the filter cake from the process fluid. The particulate matter is filtered from the fluid at approximately the same rate that it is stripped from the filter layers.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

I claim:

1. Apparatus for filtering a process fluid for removing particulate matter therefrom comprising in combination:
   (a) a rotatable drum having a perforated surface and disposed in a housing to form a plenum between the drum surface and the interior of the housing,
   (b) a tubular shaft supporting said drum, said shaft having fluid passages therethrough within said drum for removing said process fluid from within the interior of said drum,
   (c) end plates joined to said drum at each end thereof, said plates having a larger diameter than said drum to form a bed on the surface thereof,
   (d) a fiber member covering said drum surface within said bed,
   (e) means for producing a pressure differential between said plenum and the interior of said drum,
   (f) means to provide a layer of filter material covering said fiber member and extending to said end plates, said filter material formed into said layer by said pressure differential,
   (g) means for introducing said process fluid into said plenum, said pressure differential forcing process fluid through said layer of filter material,
   (h) a blade positioned against the surface of said layer of filter material, said blade extending along the length of said bed for stripping away said particulate matter collected on the surface of said filter layer as said drum rotates past said blade,
   (i) an exhaust port, said stripped particulate matter being deposited adjacent said port for entrainment within process fluid exhausted through said port, and
   (j) means to regulate the flow of said exhausted process fluid to remove said stripped particulate matter from said housing.

2. Apparatus for filtering a process fluid as recited in claim 1 further including a chamber within said housing for collecting said stripped particulate matter.

3. Apparatus for filtering a process fluid as recited in claim 1 wherein said means for producing a pressure differential comprises a pump having the input port thereto connected to said tubular shaft for removing said process fluid from the interior of said drum.

4. Apparatus for filtering a process fluid to remove particulate matter therefrom, comprising in combination,
   (a) a cylindrical housing having a rotatable central shaft therein,
   (b) a drum disposed within said housing, supported by end plates affixed to said shaft, said end plates having a greater diameter than said drum to form a bed on the exterior surface of said drum, said surface perforated to provide passage for said fluid therethrough,
   (c) structure forming a plenum exterior to said drum and within said housing,
   (d) means for establishing a pressure differential between said plenum and the interior of said drum,
   (e) a fabric covering surrounding said drum within said bed,
   (f) means to provide a layer of filter material covering said fabric within said bed,
   (g) means for introducing said fluid into said plenum wherein fluid is drawn through said layer of filter material and said particulate matter is deposited on the surface of said layer of filter material,
   (h) means for transferring fluid from the interior of said drum to the exterior of said housing,
   (i) a blade extending parallel to the axis of said drum with the edge thereof positioned adjacent the surface of said layer of filter material, said blade stripping the particulate matter collected on the surface of said layer of filter material as said drum rotates within said housing,
   (j) an exhaust port, said stripped particulate matter being deposited adjacent said port for entrainment within fluid exhausted through said port, and
   (k) mean to regulate the flow of said exhausted fluid to remove said stripped particulate matter from said housing.

5. Apparatus as recited in claim 4 wherein said means for establishing a pressure differential comprises a pump in fluid communication with said means for transferring, said pump drawing said fluid from said drum.

6. Apparatus as recited in claim 4 wherein said layer of filter material is diatomaceous earth which has been entrained in said process fluid and deposited on said fabric covering.

7. Apparatus as recited in claim 4 wherein said means for transferring comprises said central shaft having an axial passage and openings through said shaft for passage of said fluid from the interior of said drum.

* * * * *